United States Patent [19]
Lang et al.

[11] Patent Number: 5,170,631
[45] Date of Patent: Dec. 15, 1992

[54] COMBINATION CRYOGENIC AND MECHANICAL FREEZER APPARATUS AND METHOD

[75] Inventors: Gary D. Lang, Wooster; Larry M. Rohr, Canal Fulton, both of Ohio

[73] Assignee: Liquid Carbonic Corporation, Chicago, Ill.

[21] Appl. No.: 704,806

[22] Filed: May 23, 1991

[51] Int. Cl.$^5$ .............................. F25D 13/06
[52] U.S. Cl. ........................... 62/63; 62/332; 62/381
[58] Field of Search ............... 62/332, 381, 63

[56] References Cited

U.S. PATENT DOCUMENTS

| | | | |
|---|---|---|---|
| 3,412,476 | 11/1968 | Astrom | 34/147 |
| 3,507,128 | 4/1970 | Murphy et al. | 62/332 |
| 3,733,848 | 5/1973 | Duron et al. | 62/381 |
| 3,866,432 | 2/1975 | Harrison | 62/208 |
| 4,023,381 | 5/1977 | Onodera | 62/381 |
| 4,078,394 | 3/1978 | Chamberlain et al. | 62/203 |
| 4,103,507 | 8/1978 | Benois | 62/63 |
| 4,164,129 | 8/1979 | Stueber | 62/326 |
| 4,226,093 | 10/1980 | Voitko | 62/381 |
| 4,324,110 | 4/1982 | Lovette, Jr. et al. | 62/381 |
| 4,356,707 | 11/1982 | Tyree, Jr. et al. | 62/381 |
| 4,612,780 | 8/1986 | Briley et al. | 62/381 |
| 4,739,623 | 4/1988 | Tyree, Jr. et al. | 62/63 |
| 4,858,445 | 8/1989 | Rasovich | 62/374 |
| 4,866,946 | 9/1989 | Klee | 62/63 |
| 4,947,654 | 8/1990 | Sink et al. | 62/186 |

Primary Examiner—Ronald C. Capossela
Attorney, Agent, or Firm—Fitch, Even, Tabin & Flannery

[57] ABSTRACT

Combined cryogenic and mechanical refrigeration freezer utilizing an open spiral conveyor for transporting food to be frozen through a first cryogenic zone enclosed by a secondary housing and then through a mechanically refrigerated zone subjected to circulating air cooled by mechanical refrigeration and cryogenic vapor from the first cryogenic zone.

22 Claims, 3 Drawing Sheets

COMBINATION CRYOGENIC AND MECHANICAL FREEZER APPARATUS AND METHOD

BACKGROUND OF THE INVENTION

The invention relates generally to a freezer apparatus for rapidly freezing food products and, more particularly, to a food freezer apparatus using a combination of mechanical refrigeration and a liquid cryogen such as nitrogen for cooling food products within the freezer apparatus.

As the consumer demand for pre-prepared food products has steadily increased, the food industry has sought to develop better processes, techniques and equipment for preparing such foods and preserving them in a manner that will maintain the character of the foods and permit them to be reconsituted to an acceptable form for consumption. The preferred method of preserving such pre-pared foods is through quick freezing of the prepared foods in such a manner that there is little or no deterioration in food product. Since the process of freezing foods tends to dry or desiccate the foods, and since the drying rate is a function of the freezing conditions, it is important that the freeing process be controlled in a manner that will minimize the drying of the food.

The problem of freezing prepared food products is further complicated by the fact that the pre-prepared foods often arrive at the freezing process at a very elevated temperature. As a consequence, there is a greater temperature span through which the food must be cooled before it reaches the frozen condition at which no further drying will occur. Experience has indicated that the most satisfactory solution to the quick freezing of food products to minimize moisture loss has been through the use of liquid cryogen, which provides substantially lower temperatures than are available with conventional mechanical refrigeration. Although mechanical refrigeration freezers have been designed to produce temperatures below $-40°$ F. for food freezer application, there is another problem with mechanical refrigeration freezers that makes their use for fast freezing precooked foods undesirable. As a consequence of the high vapor pressure of water at temperatures around 100° F. and above, dehydration in hot, precooked products entering a freezer does not take place as a steady state transfer but as miniature explosions in the food's surface. The low temperature air produced by mechanical refrigeration is extremely dry which has a tendency to create those explosive evaporation conditions, thereby dehydrating the food being frozen by this process.

Use of liquid cryogenic cooling in food freezers is well known in the art. Examples of patents directed to cryogenic food freezers are U.S. Pat. No. 4,953,365 to Lang et al. and U.S. Pat. No. 4,739,623 to Tyree Jr. et al. Although the liquid cryogen freezer has the advantage of being able to freeze a food product quickly in order to minimize any deterioration through moisture loss, the liquid cryogen freezer is significantly more expensive to operate than a mechanical refrigeration freezer in freezing the same quantity of food. This economic disadvantage inherent with the completely cryogenic freezer has been recognized, and there have been attempts to combine cryogenic and mechanical refrigeration to achieve the quick freezing advantages of liquid cryogen while minimizing cost disadvantages addition.

The patent to Rasovich, U.S. Pat. No. 4,858,445, is an example of a combination cryogenic and mechanical freezing system. In addition, the patent to Tyree Jr. et al., U.S. No. 4,356,707, shows various embodiments, at least one of which contemplates the use of mechanical refrigeration in combination with a liquid cryogen.

In order for the combination freezer to be most effective and economical, the cryogen liquid must be used in the initial stage to freeze the outer surface of the food product quickly, to prevent or limit moisture loss and to rely on mechanical refrigeration to continue freezing the central portion of the food product. Because of the tendency of the heated core of the product to thaw the frozen exterior, it is necessary that the freezing be continuous with no interruption which might permit the surface thawing. Studies have shown that the ability of typical foods to move refrigeration away from the food surface dramatically decreases as freezing progresses. Thus, while the effectiveness of the freezing process can decrease as food progresses through the freezer, it is necessary to maintain the frozen surface to avoid further moisture loss. As a consequence of this lessening of freezing effectiveness, the amount of cooling required to lower the exterior surface to freezing from an elevated temperature and to freeze the exterior surface may be substantially equal to the amount of cooling required to completely freeze the interior of the food product. Due to the decreasing efficiency of the freezing process, it is difficult to maintain the surface in a frozen condition while removing the heat from the interior of the food product.

To illustrate the cost savings that are possible in using a process that combines optimum amounts of mechanical refrigeration cooling along with cryogenic cooling, a typical commercial example of freezing fully cooked, formed chicken breast patties will be described in terms of required heat input. Actual measured data indicates that the heat required to reduce the temperature of patties entering the freezer at 174° F. to 32° F. is 127 BTU/lb. Once the food product, chicken patties in this example, is lowered in temperature to the frozen or near frozen state, food dehydration virtually ceases. In order to complete the freezing, the temperature of the patties must be reduced to 0° F. which requires an additional 116 BTU/lb. Thus, this data illustrates that the portion of the freezing cycle in which moisture loss is the most prevalent, i.e. above 32° F., requires slightly more than one-half of the total heat input.

Since it is important to minimize the moisture loss to maintain the quality of the food being frozen, it is desirable to use the cryogen cooling during the initial stage in which the temperature is reduced to freezing or near freezing while using mechanical refrigeration for all the cooling thereafter. The principal obstacle to this approach is the tendency of the higher temperature core of the food product to thaw the frozen surface as the food product proceeds through the freezer. To accomplish the objective of providing a freezer apparatus using a combination of cryogenic cooling and mechanical refrigeration, the two types of cooling must be combined to provide uninterrupted, continuous cooling of the food products.

Commercial food freezers may be broadly categorized as batch type; in which successive loads are processed through the freezer, or continuous type freezers in which products move continuously through the freezing zone or zones on some type of conveyor belt.

The present invention involves a continuous freezer apparatus which includes a spiral or helical-type product conveying system. The Tyree Jr. et al. U.S. Pat. No. 4,356,707 discussed above in connection with the combination of mechanical refrigeration and liquid cryogen also shows the use of a spiral conveyor for continuously transporting the food articles through the freezer apparatus. Other examples of patents showing spiral conveyors used in cryogenic freezers are Tyree Jr. et al. U.S. Pat. No. 4,739,623 and Sink et al. U.S. Pat. No. 4,947,654. The U.S. Pat. No. 3,412,476 to Astrom shows the use of a helical conveyor in combination with a mechanical refrigeration apparatus using cylindrical baffles to direct circulating cooling air through the conveyor.

The spiral conveyor is recognized as an efficient and space-saving type of conveyor to use in a freezer apparatus. The typical spiral conveyor has a series of loops or turns spiraling around a rotating core which serves to drive the conveyor. A straight entrance portion conducts the products into the spiral and a similar straight exit portion delivers the frozen products through an exit opening in the insulated enclosure. By providing many linear feet of conveyor travel in a relatively small amount of floor area through the use of the multiple tiered or superimposed loops, the spiral conveyor is more attractive from a space-saving standpoint than many types of straight-line conveyors which require elongated tunnels in which the food processing or freezing would take place.

SUMMARY OF THE INVENTION

The present invention provides a combination of a freezer apparatus utilizing mechanical refrigeration and liquid cryogen cooling. The freezer apparatus includes an insulated enclosure or chamber within which a spiral conveyor is utilized to transport the food products during freezing from an entrance opening at the bottom of one side through a first cryogenic freezing zone on a spiral conveyor, continuing through a second freezing zone which is cooled by mechanical refrigeration, and discharging the food products at the upper portion of the chamber on the side remote from the entrance. The first cryogenic freezing zone is completely enclosed by baffles and has a plurality of cryogenic spray means arranged in a plurality of peripherally disposed locations above several of the superimposed loops of the spiral conveyor, within the first freezing zone. The second freezing zone is provided with a cylindrical baffle surrounding the spiral conveyor to direct circulation of the cooling air downwardly through the various superimposed loops of the spiral conveyor. A mechanical refrigeration unit is disposed within the insulated chamber and outside of the cylindrical baffle for the spiral conveyor to supply mechanically cooled air to the volume enclosed by the baffle surrounding the second freezing zone. A centrally located horizontal baffle extending outwardly from the cylindrical baffle divides the interior of the insulated chamber into high-pressure and low-pressure regions. A blower associated with the mechanical refrigeration unit circulates air upwardly into the second freezing zone, creating a negative pressure that draws the air downwardly through the second freezing zone into the mechanical refrigeration unit and upwardly through the heat exchange coils for recirculation to the second freezing zone. The efficiency of the mechanical refrigeration unit is enhanced through use of the low-temperature cryogen vapor which seeps out through the sealed exit from the first freezing zone to the second freezing zone. The use of the surplus cryogen vapor from the first freezing zone takes advantage of the cooling capacity still remaining in the cryogenic vapor as it seeps out of the first freezing zone.

The combined use of mechanical refrigeration and liquid cryogen cooling provides an efficient and flexible approach to cooling and/or freezing foods with a minimum amount of moisture loss and degradation. Depending on the temperature of the incoming food, the size of the food portions, and the rate at which they are to be processed, the combination freezer apparatus of the present invention can be operated in various manners to accommodate the processing demands. The speed of the conveyor and the time in the various freezing zones may be varied to accommodate variations in the type and volume of product to be processed and the proportion of the cooling to be performed in the liquid cryogen freezing zone. If the unit is operated under light load conditions, it may be operated entirely using the mechanical refrigeration unit. In general, however, the advantages of the combination of mechanical refrigeration and liquid cryogen cooling is achieved with initial fast freezing with the liquid cryogen even in situations where, as a consequence of the reduced load, the major portion of the cooling may be accomplished by the mechanical refrigeration.

An object of the present invention is to provide an improved food freezer having combined mechanical refrigeration and liquid cryogen cooling to freeze food products efficiently and economically.

It is another object of the present invention to provide a combined freezer apparatus having mechanical refrigeration and liquid cryogen cooling utilizing a spiral conveyor to transport the product to be frozen through a first cryogen-cooled zone and through a second mechanically cooled zone.

Still another object of the present invention is to provide an improved freezer apparatus employing mechanical refrigeration and liquid cryogen cooling utilizing a spiral conveyor for carrying food through a sealed cryogen- freezing zone and through a second zone cooled by mechanical refrigeration, with cooling air in said second zone being circulated downwardly through the superimposed loops of the food conveying belt.

These and other objects of the invention should be apparent from the following detailed description for carrying out the invention when read in conjunction with the accompanying drawings.

DETAILED DESCRIPTION OF THE PREFERRED EMBODIMENT

Figure 1:
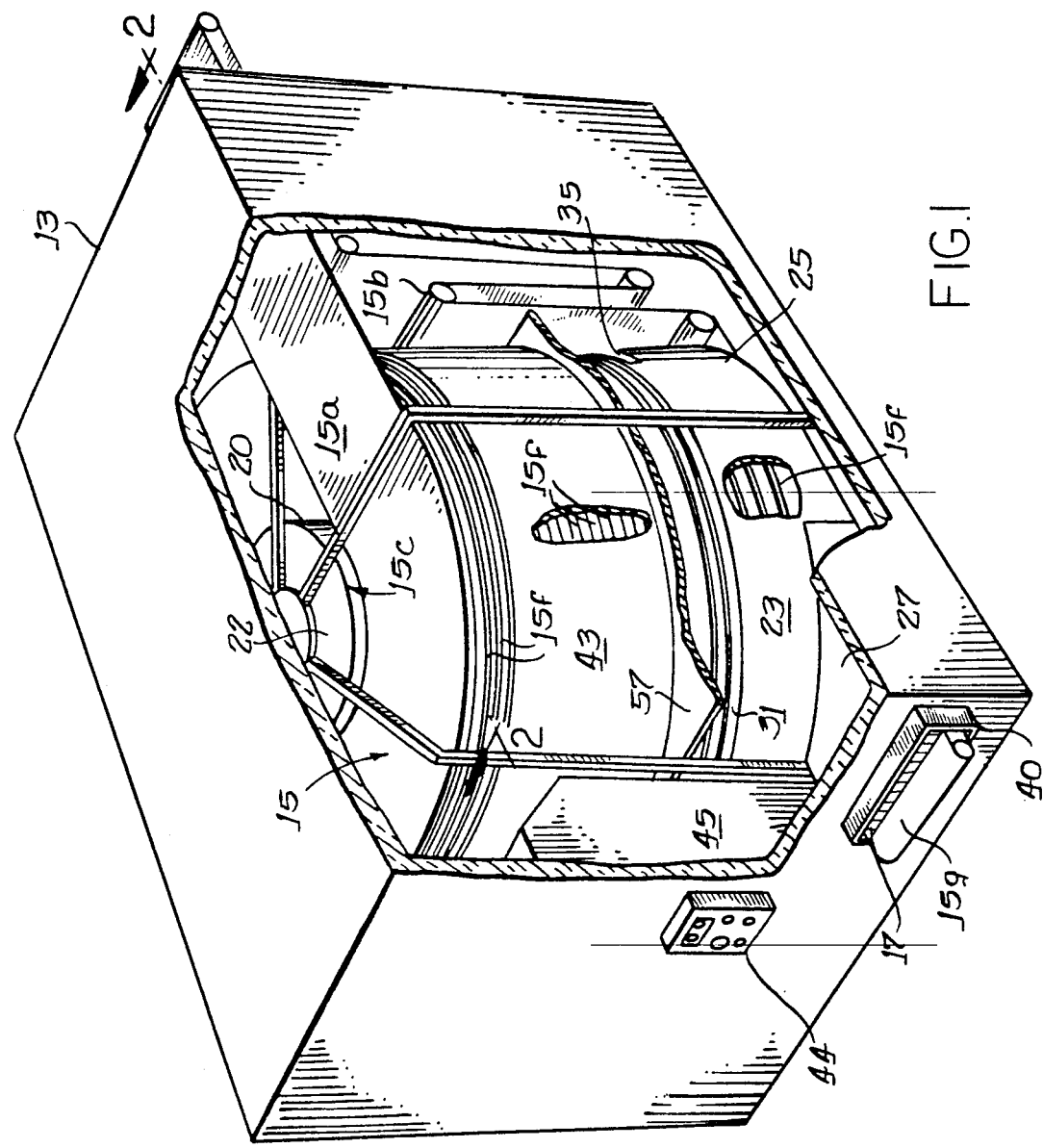
FIG. 1 is a perspective view of a combination freezer apparatus utilizing mechanical refrigeration and liquid cryogen cooling embodying the invention, portions of the insulated housing and baffling being cut away for illustrative purposes.
Figure 2:
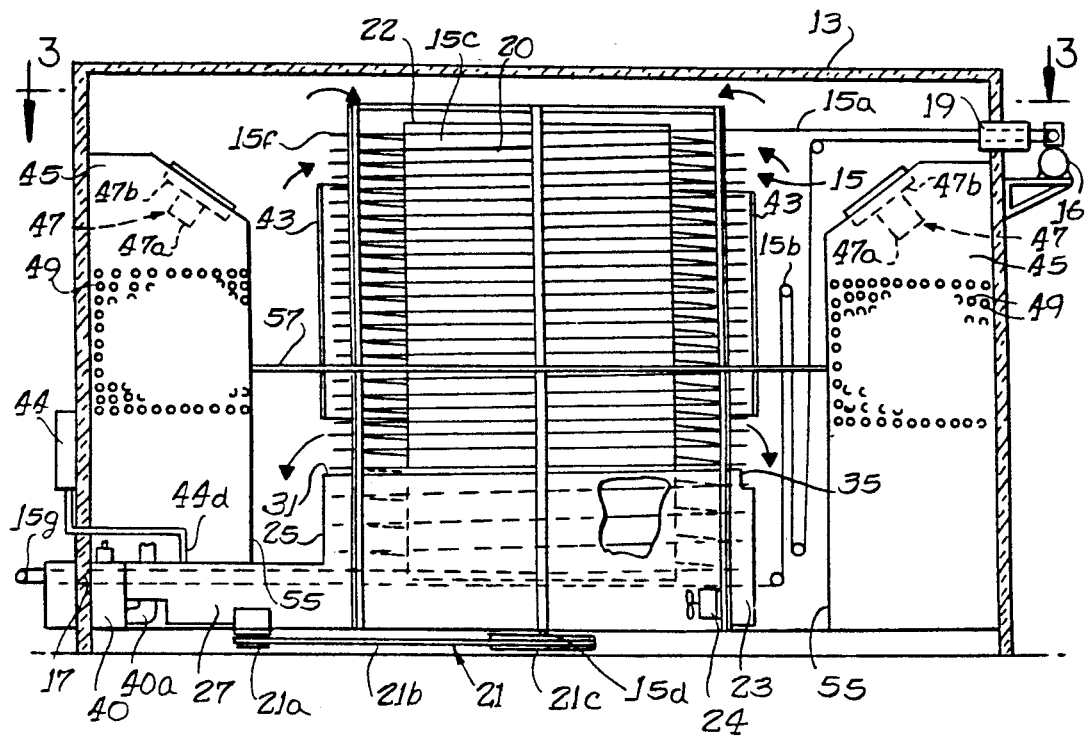
FIG. 2 is a vertical sectional view of the combination freezer apparatus of FIG. 1 taken substantially along line 2—2 of FIG. 1.

Illustrated in FIGS. 1-6 of the drawings is a combination freezer apparatus 11 which includes an insulated chamber or enclosure 13 within which there is mounted a spiral conveyor 15 which transports food products to be frozen from a lower entrance opening 17 on the left side of chamber 13, as viewed in FIG. 2, to an exit opening 19 on the upper right as viewed in FIG. 2.

The spiral conveyor 15 is of generally conventional construction having an elongated belt 15a which is of an open mesh construction and fabricated of stainless steel. The conveyor belt 15a is wrapped around idler rollers at the entrance and exit ends and is provided with a take-up mechanism 15b which is of conventional design. A belt tension adjustment means 16 is associated with the roller at the exit end to provide for varying the tension in belt 15a. For the purpose of supporting and driving the spiral conveyor 15, there is provided a central core 15c which rotates about a vertical axle 15d and which is in engagement with the inner edge of the belt 15a. The core 15c is rotated by a drive mechanism 21 including a motor 21a connected to the lower end of the axle 15d by a suitable chain 21b and sprocket 21c.

Figure 3:
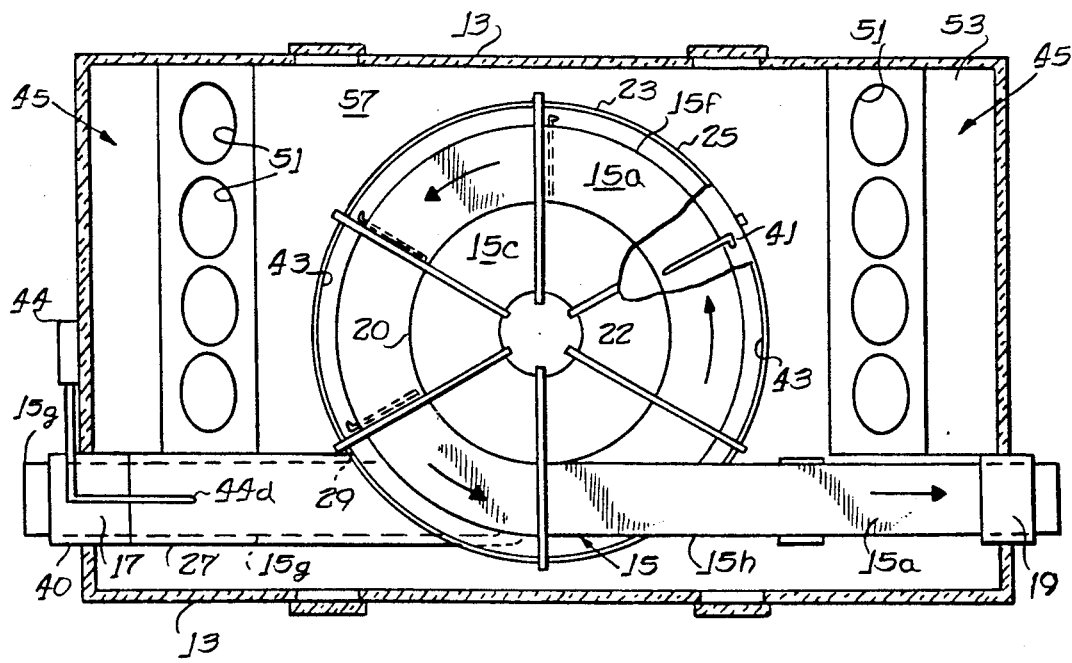
FIG. 3 is a sectional view taken substantially along line 3—3 of FIG. 2 assuming FIG. 2 included the complete freezer apparatus.

The spiral conveyor 15 includes a plurality of loops or flights 15f, each consisting of one helical loop about the core 15c. As shown in FIG. 3, the belt 15a has a straight entrance portion 15g which extends from outside the chamber 13 to the first lowermost loop of the helically disposed portion of the spiral conveyor 15. Similarly, there is an exit portion 15h which extends from the uppermost loop 15f to a portion beyond the exit opening 19. The manner in which the various loops of the belt 15a of the spiral conveyor 15 are supported and driven by the core 15c is shown and described in prior U.S. Pat. Nos. 4,356,707 to Tyree Jr. et al., 4,878,362 to Tyree Jr., and 4,953,365 to Lang et al., the disclosures of which are incorporated herein by reference. The patent to Tyree Jr., U.S. Pat. No. 4,878,362, discloses an expanding spiral conveyor belt which is suitable for use as the belt 15a, having an open construction through which cooling air may readily circulate.

It should be noted that the core 15c of the spiral conveyor 15 is formed with a solid cylindrical outer wall 20, thereby limiting passage of air toward the center of the core 15c. In addition, the core 15c is formed with a top wall 22 which extends across the top of cylindrical wall 20 and prevents any of the circulating cooling air from passing downwardly within core 15c. To the extent that the core 15c is thus a barrier to movement of cooling air, the spiral conveyor 15 is different from most of the prior spiral conveyors which have open cores for air circulation.

As will be explained in greater detail below, the spiral conveyor 15 is designed to transport food products being frozen through two distinct freezing zones, a first freezing zone, which is cooled by liquid cryogen, and a second freezing zone, which is cooled by mechanical refrigeration. Within the apparatus of the present invention there is circulation of cooled air through the mechanically refrigerated zone, and while the cryogenically cooled zone is separated from the mechanically refrigerated zone by a secondary enclosure, there may also be provision for air circulation in this secondary enclosure.

Use of the term "mechanical refrigeration" herein is intended to cover apparatus in which a cooling medium, or refrigerant, goes through a cycle so that it is recovered and reused. Generally, a vapor-compression cycle is employed wherein the liquid refrigerant is evaporated in a low pressure region, i.e., an evaporator, to produce cooling, and subsequently withdrawn to a compressor where the pressure (and temperature) of the gaseous refrigerant is raised. The gaseous refrigerant is then transferred to a condenser wherein its heat is discharged to the environment and the refrigerant liquifies, and is stored in a receiver until such time that it is to be recycled through an expansion valve back into the evaporator.

Use of the term "cryogenically cooled" or "cryogenic refrigeration" herein is intended to cover methods or apparatus in which a liquified gas, usually carbon dioxide or nitrogen, is allowed to expand and evaporate, producing temperatures of $-110°$ F. or below. Usually, the liquified gas or cryogen is expended by discharge to the atmosphere, after the desired use has been made of its capacity to absorb heat in carrying out a cooling or freezing operation.

The first or cryogenically cooled zone in the combination freezer apparatus 11 is defined by a secondary enclosure 23 which surrounds the lowermost loops of the spiral conveyor 15 and also encloses the entrance portion 15g of the conveyor, as is best shown in FIGS. 1 and 2. The secondary enclosure 23 is formed by a cylindrical baffle 25 which interconnects with an entrance tunnel 27, there being an opening 29 in the cylindrical baffle through which the conveyor belt 15a extends from tunnel 27 to the bottom loop of the spiral conveyor 15.

Figure 4:
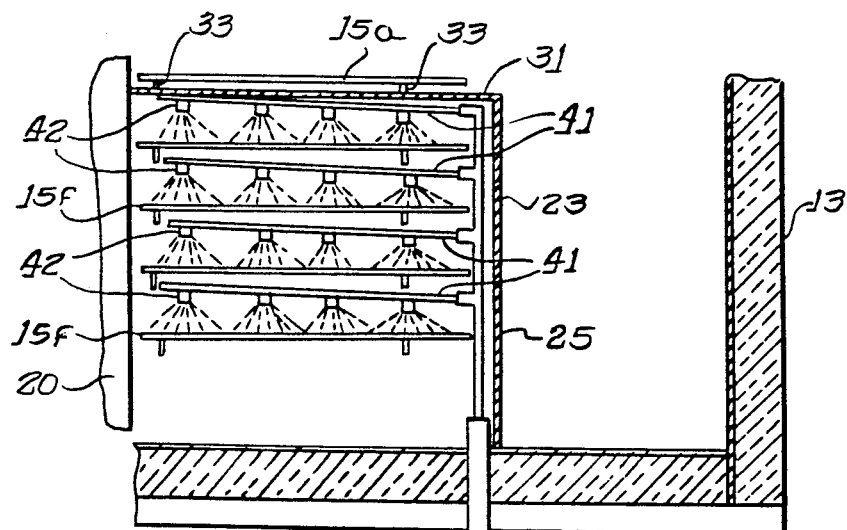
FIG. 4 is a fragmentary and somewhat schematic sectional view taken radially of the spiral conveyor to illustrate the layout of the cryogen supply.
Figure 5:
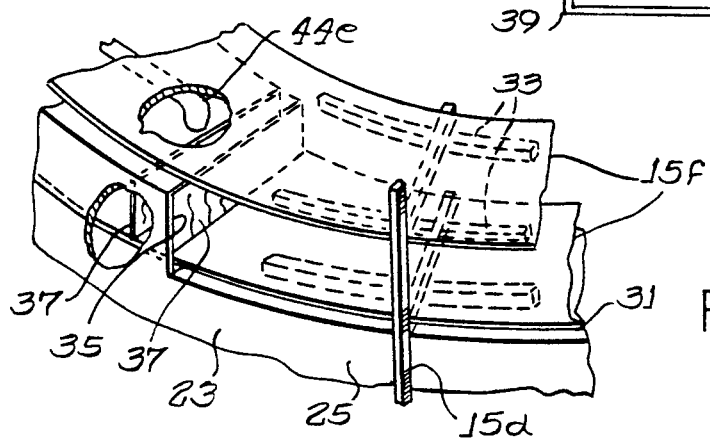
FIG. 5 is a fragmentary sectional view showing the exit opening between the first freezing zone which is cooled cryogenically and the second zone which is cooled by mechanical refrigeration.
Figure 6:
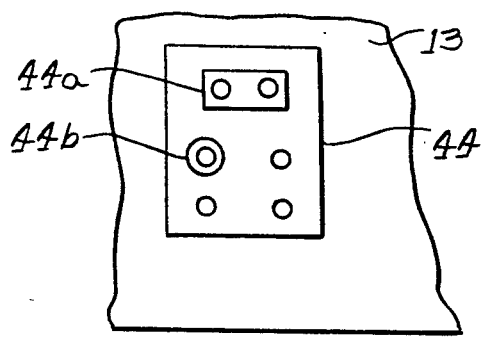
FIG. 6 is a fragmentary elevational view of the combination freezer apparatus of FIG. 1 showing the control panel.

The top of the secondary enclosure 23 is defined by an annular helical plate 31 which is secured at its outer edge to the cylindrical baffle 25, and which is secured to belt-supporting rails 33, as shown in FIGS. 4 and 5. The annular helical plate 31 extends around 1½ loops of the conveyor supporting rails 33 and is designed to seal the top of the secondary enclosure 23. The two rails 33 are helically disposed under the spiraling portion of conveyor 15 and support all of the superimposed loops 15f. As may be seen in FIG. 5, the plate 31 terminates at an exit opening 35, through which the conveyor 15a exits from the secondary enclosure 23 of the first freezing zone and enters into the second freezing zone. A set of curtains 37 is secured to the plate 31 and extends downwardly at and adjacent to the opening 35 into engagement with the belt 15a for the purpose of sealing the opening 35 against the escape of cryogen vapor, as will be explained more completely below. The set of curtains 37 includes one curtain at the opening 35 and an additional curtain spaced about six inches inside enclosure 23.

For the purpose of delivering liquid cryogen to the surface portions of the loops of the spiral conveyor 15 within the secondary enclosure 23, there is provided a series of cryogen feed lines 39, one of which is shown in FIG. 4. Although the structure and layout of the feed lines 39 are not shown in detail, it is contemplated that the feed lines 39 would be constructed in accordance with the teaching of the above cited Lang et al. U.S. Pat. No. 4,953,365 to eliminate the possibility of feed line blockages by frozen cryogen.

The feed lines 39 are positioned at 60° intervals around the core 15c to deliver liquid cryogen through headers 41, each of which supports four equally spaced spray openings or nozzles 42. As indicated in FIGS. 3 and 4, there are six headers located over each of four of the loops within the secondary enclosure 23. The specific disclosed arrangement and number of feed lines, headers or nozzles are not critical to the practicing of the invention and may be varied to meet the requirements of a particular installation to provide adequate cryogen to accomplish the preliminary cooling and surface freezing of the food products involved. These requirements would depend on the nature of the food products, mass of products, incoming temperature, conveyor speed, etc. It is noted that the pitch or interval between the loops 15f of the spiral conveyor 15 within the secondary enclosure 23, is substantially greater than the pitch or spacing between the loops 15f in the spiral conveyor 15 within the area above the secondary enclosure. In the preferred embodiment the pitch in the enclosure 23 was twice that of the pitch of the conveyor above the secondary enclosure. This greater spacing may be necessary in some installations to accommodate the cryogen spray headers and permit the distribution of the cryogen across the food being transported by the spiral conveyor 15.

Within the enclosure 23 there is substantial unobstructed space provided beneath the conveyor 15 for circulation of air and cryogen vapor. A blower 24 is positioned within the enclosure 23 as shown in FIG. 2 to circulate air and cryogen vapor that has dropped to the bottom of enclosure 23. The circulation created by blower 24 assures efficient use of the cryogen by extracting the maximum heat possible therefrom.

The food to be frozen in the combination freezer apparatus 11 is placed on the outer end of the entrance conveyor portion 15g, where it is carried through the tunnel 27, through the opening 29 into the first freezing zone as it moves onto the bottommost loop 15f of the spiral conveyor 15. At the entrance opening 17, there is provided a dilution chamber 40 which includes a blower controlled exhaust duct 40a. The dilution chamber 40 is a known means for controlling the entrance of outside air into enclosure 13 and regulating the outflow of cryogen vapor from the enclosure 13 through opening 17. By automatically controlling the flow of gas exhausted through duct 40a and the flow of cryogen into the secondary enclosure 23, the ingress of air and egress of cryogen vapor through opening 17 can be minimized. Such a vapor control for the entrance opening of a cryogen freezer is disclosed in detail in the commonly assigned U.S. Pat. No. 4,947,654 which is incorporated by reference as if fully set forth herein. There are, of course, other types of seals which would be suitable for use in this application.

As the food progresses upwardly in the first freezing zone on the conveyor 15, it is sprayed with liquid cryogen from the headers 41. The substantial number and distribution of the headers 41 permit a considerable volume of food products to be processed through the combination freezer apparatus 11. As stated above, the specific arrangement of the cryogen feed lines 39 forms no part of the present invention but should be in accordance with the teachings of the to Lang et al., U.S. Pat. No. 4,953,365. Suitable controls may be provided to use selectively any number of the cryogen spray headers located in the secondary enclosure 23, or the first freezing zone. The various feed lines 39 are each controlled by a cryogen control 38. Depending on the flexibility of operation desired, separate controls may be provided and separate feed lines provided for each horizontal bank of six headers 41 over any one conveyor loop 15f. In addition, each of these banks may be further subdivided with separate feed lines 39 and controls 38. As shown schematically in FIG. 6, there is provided a master control panel 44 which includes an adjustable cryogen temperature control unit 44a which responds to either one or both of two thermocouples disposed adjacent the entrance and exit openings for the first freezing zone. As shown in FIGS. 2 and 3 a thermocouple 44d is located within the entrance tunnel 27 and a second thermocouple 44c is mounted in the secondary enclosure 23 at a location spaced inwardly from the exit opening 35 and inside the set of curtains 37. A selector switch on the control 44a allows the operator to control the cryogen flow based on either of the two thermocouple signals or an average of the two. In any of these three alternative modes of operation, the thermocouples sense the temperature of the food products and modulate or turn on and off the flow of cryogen. The adjustable temperature control unit 44a is connected to send appropriate signals to each cryogen control 38 in order to supply appropriate cryogen flow to the food products.

The primary objective in the first freezing zone is to thoroughly freeze the exterior surfaces of the food products being processed to minimize the moisture loss and to avoid any deterioration of the food products. Depending on the mass and the temperature of the food products and the speed of the belt 15a, more or less cryogen may be required from the headers 41. In order to regulate the speed of the belt drive motor 21a, there is provided on the master control panel 44 a motor control 44b which controls the speed and the starting and stopping of motor 21a.

When the food products exit the first freezing zone though the opening 35, the flexible set of curtains 37 is pushed aside by the food products, thereby permitting them to exit the first freezing zone and enter the second freezing zone. The flexible curtains are well known in form, having a plurality of slits to provide deflectable fingers which tend to seal the opening 35, but still permit product to pass outwardly on the belt 15a by deflecting some of the fingers in the curtain.

The second freezing zone is defined by a cylindrical baffle 43 which is of the same diameter and is aligned with the cylindrical baffle 25 discussed above in connection with the secondary enclosure 23. The cylindrical baffle 43 is disposed in closely spaced relationship around the spiral conveyor 15 with its uppermost edge leaving exposed a portion of the spiral conveyor, and at its lowermost end, leaving exposed a portion of the spiral conveyor. However, it should be appreciated that specific details of the baffle 43 and its positioning with respect to the loops of the spiral conveyor will depend on the direction and velocity of the cooling air circulated within the second freezing zone, the principal objective being to assure optimum engagement of the food products on the conveyor 15 by the cooling air.

Positioned within the insulated enclosure 13 are mechanical refrigeration units 45 which include blowers 47 and heat exchange coils or evaporators 49. In the disclosed embodiment there are included two refrigeration units positioned at opposite ends of the enclosure 13. However, a single unit may be used or alternatively two units might be situated side by side. The refrigeration units 45 include compressors, condensers and means for delivery of refrigerant to the heat exchange coils 49, which compressors and condensers are conventional and are not shown in the drawings since they would be located outside of the enclosure 13. The blowers 47 include motors 47a and air impellers 47b which force circulating air upwardly through openings 51 in refrigeration cabinets 53. Openings 55 at the bottom of the refrigeration unit cabinets 53 facing the spiral conveyor 15 allow circulating air to enter the cabinets 53, pass over the heat exchange coils 49, and discharge inwardly and upwardly through the openings 51. Thus, the air cooled by the refrigeration coils 49 is circulated upwardly into the upper portion of the spiral conveyor 15 from where it passes downwardly through the loops 15f of the conveyor 15. As the air moves downwardly, it is confined between the cylindrical wall 20 of the core 15c and the cylindrical baffle 43 in a somewhat cylindrical or donut-shaped space. The cooling air as it circulates downwardly is then discharged outwardly under the lower end of the baffle 43, as it encounters the secondary enclosure 23. The mechanical refrigeration units 45 are controlled by a slide valve control on the compressor control panel (not shown) which responds to a pressure sensor in the refrigeration loop to operate the slide valve in a conventional manner.

The enclosure 13 is centrally divided by a horizontal baffle or wall 57 which extends outwardly from the cylindrical baffle 43, as is best shown in FIGS. 1 and 2. The baffle 57 serves to divide the interior of the enclosure 13 into a positive pressure region above the baffle 57 and a negative pressure region below the baffle 57. This pressure differential is a result of the air circulated by the blowers 47 which create the increased pressure above the baffle 57. The negative pressure below the baffle 57 causes the air chilled by the mechanical refrigeration units 45 to be drawn downwardly through the spiral conveyor 15 and through the second freezing zone.

The overall efficiency of the freezer apparatus 11 is increased due to the gradual exodus of cryogen vapor from the secondary enclosure 23 through the opening 35. In spite of the set of curtains 37 sealing the opening, there will over time be a certain amount of the cryogen vapor which will be carried along with the conveyor and the food products through the opening 35 and be recirculated with the air through the mechanical refrigeration units 45. This leakage and recirculation is desirable since the escaping cryogen vapor still has considerable cooling capacity, being at a low temperature. Accordingly, additional heat is extracted from the food products through further warming of the cryogen vapor as it circulates along with the air cooled by the mechanical refrigeration units 45.

An important operating condition in the combination freezer apparatus 11 relates to the temperature levels maintained in the first and second freezing zones. Under normal operating conditions the temperatures in both of these zones should be on the order of $-40°$ F. to $-50°$ F. Although the cryogen itself may be on the order of $-110°$ F. or $-320°$ F. depending on whether it is $CO_2$ or $N_2$, it takes heat from the food products primarily by surface contact rather than raising the ambient temperature level in the first freezing zone. The apparatus 11 is operated with as little cryogen as necessary to accomplish the objective of freezing the exterior surface of the food products. If an excess of cryogen is utilized in the first freezing zone, it tends to carry over into the second freezing zone and reduce the efficiency of the apparatus. If too much cryogen carries over into the mechanical freezing zone, the absence of a heat load on the temperature coils 49 will cause the mechanical refrigeration unit to shut down. Accordingly, while it is an important advantage to have the first and second freezing zones closely coupled together, there is also a risk that if not properly controlled, the cryogenic section will overwhelm the mechanical freezer section thereby eliminating the cost advantages inherent in the combination freezer.

Among the advantages accruing from the use of the closely coupled cryogenic and mechanical refrigeration freezing zones is the capacity to adjust or tailor the process to the particular food products being frozen in order to achieve the most favorable balance of cryogenic freezing and mechanical refrigeration freezing. Depending on the mass of the product, the thickness and the incoming temperature, there may be more or less cryogenic cooling required to cool the product quickly to at or near the 32° F. level where moisture loss is minimized. It is possible with the combination freezer of the present invention to use only that amount of cryogen necessary to accomplish the rapid initial chilling of the food product, while relying on the less costly mechanical refrigeration to complete the freezing of the product. The result is that the combination cryogenic and mechanical freezer apparatus of the present invention uses about one-half the cryogen that a fully cryogenic freezer uses.

As noted earlier, the manner in which the cryogen vapor is used in the second freezer zone for as much heat absorption as possible further increases the overall efficiency of the system. The temperature of the cryogen vapor is ultimately raised to close to the temperature of the refrigerated circulating air.

The arrangement of one of the freezing zones immediately above the other freezing zone and the enclosure of both freezing zones within a single insulated enclosure provides a completely closed system with no intermediate transfer of the product being processed. This arrangement therefore produces more efficient and cost effective freezing of food products than has heretofore been possible with known food freezers. The use of the spiral conveyor in this combination freezer not only provides the space saving inherent with this design, but also provides superior results as compared to the prior art spiral conveyor freezers using either totally cryogenic or totally mechanical refrigeration. While the disclosed embodiment included an ascending spiral conveyor, it is contemplated that a descending spiral conveyor would also be applicable to the present invention. The second freezing zone could be located beneath the first freezing zone without detracting from the benefits and advantages inherent in the disclosed invention.

Although the invention has been described with regard to a preferred embodiment, it should be understood that various changes and modifications as would be obvious to one having the ordinary skill in this art may be made without departing from the scope of the invention which is defined in the appended claims.

What is claimed is:

1. Apparatus for cooling and freezing portions of food comprising,
    an insulated enclosure formed with an entrance opening through which food is inserted and an exit opening through which frozen food is discharged, an opening conveyor extending continuously from said entrance opening to said exit opening for transporting food portions through a first zone which is cryogenically cooled and a second zone cooled by a mechanical refrigeration unit, said first and second zones being superimposed one over the other, a source of cryogenic material for directing cryogenic material to said food portions on said conveyor in said first zone, a mechanical refrigeration unit having a cooling coils and a blower for circulating air through said cooling coils and said second zone to cool food portions and on said conveyor in said second zone, said cryogenic material including cryogenic vapor which is circulated by said blower across said cooling coils and said food portions on said conveyor in said second zone, a secondary enclosure surrounding said first zone, second secondary enclosure being disposed within said insulated enclosure, said secondary enclosure restricting circulation of cryogen into said second zone to limit the effect of said cryogen in cooling said food portions within said second zone; and said open conveyor continuously extending between said first and said second zones so as to pass through said secondary enclosure.

2. Apparatus for freezing portions of food as set forth in claim 1 wherein said open conveyor is a spiral conveyor having a plurality of superimposed loops, cylindrical baffle means surrounding said spiral conveyor, said spiral conveyor transporting said food portions through said first and second zones, said cylindrical baffle means including a first cylindrical baffle which enclosures a portion of said second zone and directs said circulating air through portions of said spiral conveyor disposed in said second zone; said first cylindrical baffle having a first axis which is disposed vertically and having an upper end and a lower end; said blower and cooling coils being supported outside of said cylindrical baffle means and within said insulated enclosure, said blower forcing said circulating air into one end of said first cylindrical baffle through said open conveyor in said second zone and outwardly of said cylindrical baffle at the other end.

3. Apparatus for cooling and freezing portions of food as set forth in claim 2 wherein said first zone is circumscribed in part by a second cylindrical baffle which has a second axis coincident with said first axis of said first cylindrical baffle and by an annular baffle disposed between two of said superimposed loops o said spiral conveyor and being supported on said second cylindrical baffle, said annular baffle defining a barrier between said first zone and said second zone limiting downward movement of said circulating air from said second zone.

4. Apparatus for cooling and freezing portions of food as set forth in claim 3 wherein said conveyor includes an entrance section which extends from said entrance opening to a vertically disposed upwardly moving spiral portion having superimposed loops driven by a rotating cylindrical core, said conveyor including an exit section which extends from the uppermost portion of said spiral portion to said exit opening, said entrance and exit sections being generally tangential to said spiral portion, and wall means defining a closed conduit enclosing said entrance section of said conveyor and extending from said entrance opening to said second cylindrical baffle.

5. Apparatus for cooling and freezing portions of food as set forth in claim 4 wherein said source of cryogenic material includes a plurality of cryogen headers disposed within said first zone extending radially with respect to said cylindrical core, each of said cryogen headers having spray means to direct cryogenic material downwardly onto said open conveyor, said cryogen headers being disposed at a plurality of peripherally spaced locations on a plurality of said superimposed loops of said open conveyor in said first zone.

6. Apparatus for cooling and freezing portions of food as set forth in claim 5 wherein said insulated enclosure is provided with seal means at said entrance and exit openings to restrict entrance of air and the discharge of cold air and cryogen vapor, said open conveyor and said food portions carried thereon transferring cryogen vapor from said first zone to said second zone where said cryogen vapor mixes with the air circulated by said blower.

7. Apparatus for cooling and freezing portions of food as set forth in claim 6 including a horizontal baffle extending outwardly from said first cylindrical baffle, said horizontal baffle dividing said enclosure into a positive pressure region and a negative pressure region, said blower being positioned to recirculate air and cryogen vapor from said negative pressure region into said positive pressure region, said first cylindrical baffle directing air and cryogen vapor downwardly from said positive pressure region into said negative pressure region.

8. Apparatus for cooling and freezing portions of food as set forth in claim 7 wherein said mechanical refrigeration unit includes a housing disposed within said enclosure and extending through said horizontal baffle, said housing containing said cooling coils and said blower, said housing having an air and cryogenic vapor inlet below said horizontal baffle and an air and cryogenic vapor outlet above said horizontal baffle, said blower being mounted to circulate air and cryogenic vapor through said outlet and to direct said air and cryogenic vapor toward the upper end of said first cylindrical baffle.

9. Apparatus for cooling and freezing portions of food as set forth in claim 8 wherein said mechanical refrigeration unit is operable without use of said refrigerant coils whereby freezing of food portions is completed by said cryogenic cooling, and said mechanical refrigeration unit is operable to freeze said food portions without use of said cryogenic cooling.

10. A combined cryogenic and mechanical refrigeration food freezer comprising an insulated housing, an open helical conveyor received within said housing, said helical conveyor having a plurality of superimposed helical loops which transport food portions to be frozen along a helical path, said superimposed loops being in contact with and driven by a cylindrical core which rotates about a vertical axis, a first cylindrical baffle and a second cylindrical baffle, said cylindrical baffles surrounding said helical conveyor and being vertically spaced from each other, each said cylindrical baffle having an axis which is aligned with said vertical axis and being mounted in closely spaced relation with said helical conveyor, said first cylindrical baffle and said cylindrical core defining a first freezing zone which is generally cylindrical in shape, sad second cylindrical baffle and said cylindrical core defining a second freezing zone which is generally cylindrical in shape and is located adjacent to said first freezing zone, each of said freezing zones having a food entrance and food exit, a source of cryogenic cooling in said first freezing zone, mechanical refrigeration for cooling said second freezing zone, said mechanical refrigeration including cooling coils and a blower mounted within said insulated housing for circulating a heat transfer gas through said cooling coils and said second freezing zone, a secondary housing surrounding said first freezing zone, said secondary housing being disposed within said insulated housing, so as to completely enclose said first freezing zone except for restricted food entrance and food exit openings, said secondary housing restricting circulation of cryogen into said second freezing zone to limit the effect of said cryogen in cooling said food portions within said second freezing zone, and said open conveyor continuously extending between said first and said second zones so as to pass through said secondary enclosure.

11. A combined cryogenic and mechanical refrigeration food freezer as set forth in claim 10 wherein said helical conveyor transports food portions upwardly along said helical path, and said second freezing zone being disposed above said first freezing zone.

12. A combined cryogenic and mechanical refrigeration food freezer as set forth in claim 11, wherein said secondary housing is formed in part by said first cylindrical baffle, said secondary housing having a circular bottom wall supporting said first cylindrical baffle and a top wall extending between said first cylindrical baffle and said cylindrical core, said top wall having a helical loop configuration and being disposed between two adjacent loops of said helical conveyor.

13. A combined cryogenic and 12 mechanical refrigeration food freezer as set forth in claim 12 wherein said source of cryogenic cooling includes a plurality of crygoen spray means in said secondary housing above a plurality of said loops of said open conveyor to spray cryogen on food portions on said conveyor in said first zone.

14. A combined cryogenic and mechanical refrigeration food freezer as set forth in claim 13 wherein said spray means include a plurality of headers which extend radially with respect to said vertical axis and extend across said open conveyor, nozzles supported on said headers to spray cryogen onto said food portions, said nozzles being spaced lengthwise on said headers distributing cryogen uniformly to food portions passing beneath said headers on said open conveyor.

15. A combined cryogenic and mechanical refrigeration food freezer as set forth in claim 12 wherein secondary housing is provided with a flexible curtain to seal said food exit opening from said first freezing zone, said curtain having a top edge and a bottom edge, said top edge being attached to said top wall of said secondary housing with the bottom edge being adjacent to the said open conveyor.

16. A combined cryogenic and mechanical refrigeration food freezer as set forth in claim 15 having an entrance opening seal which blocks entry of outside air into said first freezing zone and blocks discharge of cryogenic vapor through said entrance opening, said entrance opening seal having a trap connected to exhaust means which automatically regulates the pressure at said entrance opening.

17. A method of fast freezing food products comprising the steps of:

providing first and second contiguous freezing zones with the first freezing zone located beneath said second freezing zone, so as to provide continuous exposure of said food products to subfreezing cooling media as said food products move through said first and second freezing zones, providing a helical conveyor which continuously extends between said first and said second freezing zones, enclosing said first and second cooling zones with an insulated enclosure, placing food products on the helical conveyor to transport said food products through first and second freezing zones, providing a sealed enclosure within the insulated enclosure for said first freezing zone with means for supplying a cryogenic material to said food products along a length of conveyor within said first freezing zone, transporting said products through said sealed enclosure, between said first and second cooling zones, subjecting said food products moving continuously through said first freezing zone to sufficient cryogenic material to freeze the outer surface of said food products while the interior remains unfrozen, subjecting said food products moving continuously through said second freezing zone to circulating air coupled by mechanical refrigeration means for a sufficient period of time to complete freezing the interior portions of said food products with said circulating air in said second freezing zone being cooled in part by cryogenic material carried over from said first freezing zone to said second freezing zone by said conveyor and food products.

18. A method of fast freezing food products as set forth in claim 17 wherein said first and second freezing zones comprise vertically aligned cylindrical volumes through which said helical conveyor continuously transports said food products, sand the step of varying the proportion of the cooling to which food products are subjected in said first freezing zone to the cooling to which food products are subject in said second freezing zone.

19. A method of fast freezing food products as set forth in claim 17 wherein said food products placed on said continuous conveyor are precooked foods which are inserted into said first freezing zone at an elevated temperature, the temperature of said food products extending said first freezing zone being sensed and such sensed temperature being used to control the amount of cryogenic material to which said food products are subjected in said first freezing zone.

20. Combination freezer apparatus for fast freezing of food products in two stages in a continuous process comprising, an insulated enclosure formed with an entrance opening thrush which food is inserted and an exit opening through which frozen food is discharged, a continuous conveyor extending from said entrance opening to said exit opening for transporting food portions through a first zone which is cryogenically cooled and a second zone which is cooled by a mechanical refrigeration unit, a mechanical refrigeration unit within said enclosure cooling a gaseous heat transfer medium which is circulated through said second zone for further cooling of food portions received from said first zone, a secondary housing within said insulated enclosure defining said first zone, said secondary housing enclosing the portion of said continuous conveyor extending from said entrance opening through said first zone, cryogenic cooling means supplying cryogen to food portions along a length of conveyor in said first zone, said secondary housing having a restricted exit opening through which said continuous conveyor and food portions thereon pass from said first zone to said second zone, seal means in said restricted exit opening to limit circulation of gas and vapor between said first and second zones, said continuous conveyor comprising a helical conveyor having a plurality of superimposed helical loops which transport said food products upwardly through said first and second zones, said conveyor being enclosed by a cylindrical baffle means having a lower portion including portions of said secondary housing and an upper portion defining limits of said second zone, and said mechanical refrigeration unit circulating said gaseous heat transfer medium within said upper portion of said cylindrical baffle means through the helical loops of said continuous conveyor within said second zone to complete the freezing of said food products.

21. Combination freezer apparatus for fast freezing of food products as recited in claim 20 wherein said secondary housing a is maintained at substantially the same temperature as the temperature maintained in said second zone, said seal means limiting the movement of cryogen from said first zone to said second zone.

22. Combination freezer apparatus for fast freezing of food products as recited in claim 20 including control means to supply cryogen to said first zone in a quantity to freeze the exterior surface portions of said food products within said first zone, and control means for regulating the temperature of said circulating heat transfer medium in said second zone to completely freeze said food products.

* * * * *

UNITED STATES PATENT AND TRADEMARK OFFICE
CERTIFICATE OF CORRECTION

PATENT NO. : 5,170,631
DATED : December 15, 1992
INVENTOR(S) : Lang et al.

It is certified that error appears in the above-identified patent and that said Letters Patent is hereby corrected as shown below:

Column 1, line 20, change "pre-pared" to --pre-prepared--.

Column 1, line 25, change "freeing" to --freezing--.

Column 1, line 68, after "disadvantages" delete "addition".

Column 2, line 46, change "BTU/lb." to --BTU/lb.---.

Column 7, line 64, after "of the" delete "to".

IN THE CLAIMS:

Claim 1, Column 11, line 1, change "an opening" to --an open--.

Claim 1, Column 11, line 11, after "having" delete "a".

Claim 1, Column 11, line 14, after "portions" delete "and".

Claim 2, Column 11, line 35, change "enclosures" to --encloses--.

Claim 3, Column 11, line 52, after "loops", change "o" to --of--.

Claim 13, Column 13, line 45, after "and" delete "12".

Claim 17, Column 14, line 38, change "coupled" to --cooled--.

UNITED STATES PATENT AND TRADEMARK OFFICE
CERTIFICATE OF CORRECTION

PATENT NO. : 5,170,631
DATED : December 15, 1992
INVENTOR(S) : Lang et al.

It is certified that error appears in the above-identified patent and that said Letters Patent is hereby corrected as shown below:

IN THE CLAIMS: (continued)

Claim 18, Column 14, line 49, change "sand" to --and--.

Claim 19, Column 14, line 59, change "extending" to --entering--.

Claim 20, Column 14, line 67, change "thrush" to --through--.

Claim 21, Column 16, line 15, after "housing" delete "a".

Signed and Sealed this

Eighth Day of February, 1994

BRUCE LEHMAN

Attest:

Attesting Officer     Commissioner of Patents and Trademarks